United States Patent [19]
Shimamori et al.

[11] Patent Number: 5,691,631
[45] Date of Patent: Nov. 25, 1997

[54] POWER SUPPLY APPARATUS

[75] Inventors: Hiroshi Shimamori; Ryuichi Yanagisawa; Shinichi Ohtsu, all of Kawasaki, Japan

[73] Assignee: Fujitsu Limited, Kanagawa, Japan

[21] Appl. No.: 462,289

[22] Filed: Jun. 5, 1995

[30]  Foreign Application Priority Data

Jul. 10, 1994  [JP]  Japan .................................. 6-243657

[51] Int. Cl.$^6$ ........................................................ G05F 1/56
[52] U.S. Cl. ........................... 323/272; 323/222; 323/282; 363/65
[58] Field of Search ................................. 323/222, 268, 323/269, 272, 273, 282; 363/21, 65, 71

[56]  References Cited

U.S. PATENT DOCUMENTS

| | | | |
|---|---|---|---|
| 4,186,437 | 1/1980 | Cuk ........................................ | 363/65 |
| 5,404,092 | 4/1995 | Gegner ................................... | 323/207 |
| 5,414,341 | 5/1995 | Brown .................................... | 323/268 |

*Primary Examiner*—Jeffrey L. Sterrett
*Attorney, Agent, or Firm*—Nikaido Marmelstein Murray & Oram LLP

[57]  ABSTRACT

The apparatus of the present invention has an interface circuit which returns power in H-level output state, a first power circuit supplying a first supply voltage, and a second power circuit supplying a second supply voltage. The second power circuit receives the entered first supply voltage from the first power circuit, and in a first operation mode (L-level output condition), brings the first supply voltage of 3.3 V down to the second supply voltage of 1.5 V and supplies same to the interface circuit. In a second operation mode (H-level output condition) of the load circuit, a current output from the load circuit is brought up to the first supply voltage of 3.3 V and feeds same back to the first power circuit.

12 Claims, 12 Drawing Sheets

POWER SUPPLY APPARATUS

BACKGROUND OF THE INVENTION

The present invention relates to a two-way power supply apparatus which operates with high and low values of voltage and has an operating mode of consuming power from the high-voltage power supply, and another operating mode of sending power back to the low-voltage power supply. More particularly, the present invention relates to a power supply apparatus having a high-speed interface which reduces an excessive power consumption in the power returning mode.

Figure 1:
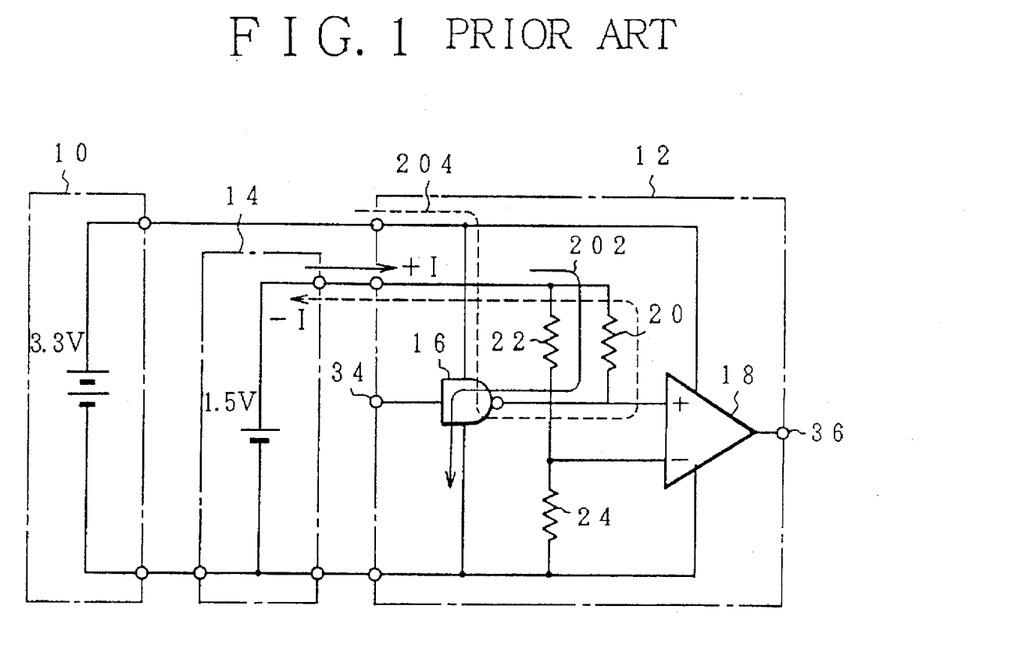
FIG. 1 is a circuit diagram of a conventional apparatus.

A circuit provided with a comparator is now becoming more popular as a high-speed interface circuit. In FIG. 1, a high-speed interface circuit 12 has an invertor 16 and a comparator 18. The high-speed interface circuit 12 is supplied with 3.3 V supply voltage, for example, from a first power circuit 10. Supply voltage of 1.5 V is supplied from a second power circuit 14. Supply voltage of 3.3 V from the first power circuit 10 is used as a driving power supply for invertor 16 and comparator 18. Supply voltage of 1.5 V from the second power circuit 14 pulls up an output line of the invertor 16 through a resistance R20. A reference voltage for the comparator 18 is set from voltage division by resistances 22 and 24.

When an input terminal 34 is a H-level, internal impedance between an output terminal of the invertor 16 and a minus line takes an value of almost zero, and an output of the invertor 16 is an L-level. At this point, current as represented by a solid line 202 flows through a path including a pull-up resistor 20 and the invertor 16, resulting in a decreased output voltage of the invertor 16 of about 0 V. Consequently, output voltage of the invertor 16 becomes lower than the reference voltage, and an output terminal 36 of the comparator 18 becomes an L-level.

When the input terminal 34 is an L-level, internal impedance between a supply terminal and the output terminal of the invertor 16 becomes almost zero, and output of the invertor 16 becomes a H-level, i.e., a supply voltage of 3.3 V is applied to the output line. As a result, output voltage of the invertor 16 becomes lower than the reference voltage, and an output terminal of the comparator 18 becomes a H-level.

In the high-speed interface circuit of FIG. 1, however, when a supply voltage of almost 3.3 V is applied to the output line due to output from the invertor 16 becoming a H-level, current flows through a path as represented by a broken line 204 via the pull-up resistor into a second power circuit 14 having a lower supply voltage of 1.5 V. When current thus flows into the second power circuit 14, output voltage thereof increases and becomes less stable, and along with this, the reference voltage of the comparator 18 increases as well. An operating point of the comparator 18 changes accordingly and becomes less stable.

Figure 2:
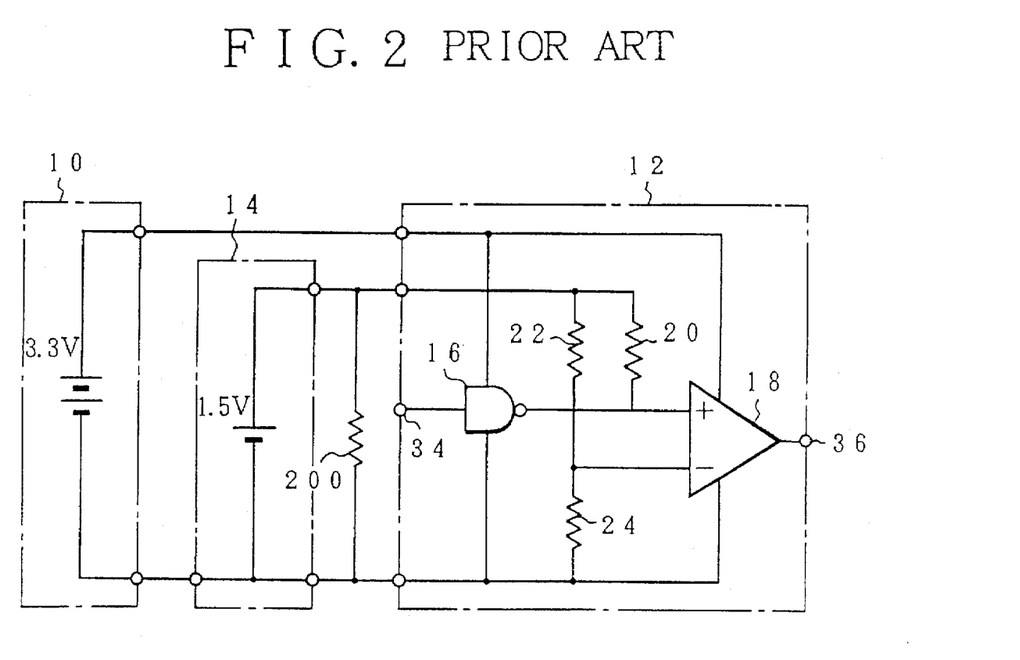
FIG. 2 is a circuit diagram of a conventional apparatus using a dummy resistor.
Figure 3A:
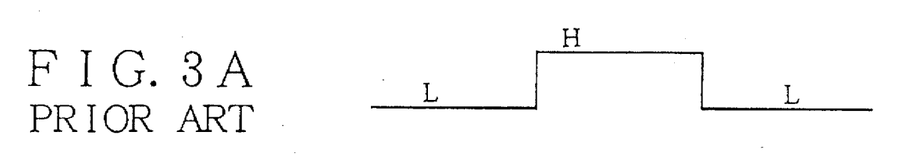
FIGS. 3A and 3B are timing charts of consumption of return current by the dummy resistor of FIG. 2.
Figure 3B:
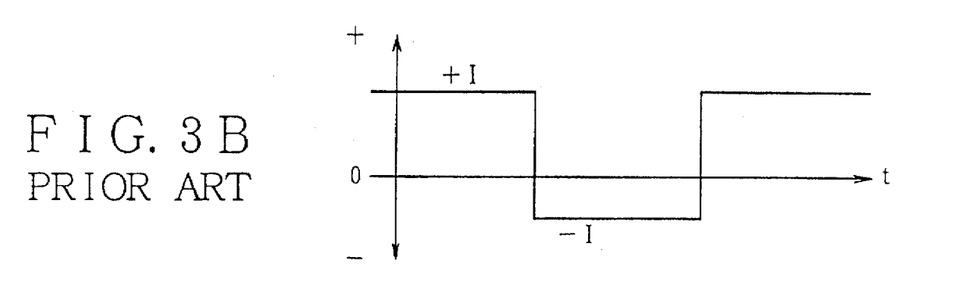

In order to solve this problem, it suffices, as shown in FIG. 2, to connect a dummy resistor 200 capable of consuming maximum current flowing into the second power circuit 14. More specifically, the flow of current into the second power circuit 14 can be eliminated, thus keeping output voltage in a stable state, by always causing the dummy resistor 200 to consume the fraction of current flowing out from the high-speed interface circuit 12 on the load side. However, this would result in constant consumption of outflowing current I by the dummy resistor 200 in the H-level state of the invertor 16 as shown in FIG. 3A, and it would accordingly be necessary to increase the power circuit capacity by a value corresponding to the consumption by the dummy resistor 200. Since power is always consumed by the dummy resistor, another problem of decreased power efficiency is encountered.

SUMMARY OF THE INVENTION

According to the present invention, there is provided a power supply apparatus which permits returning power from the load side without causing fluctuations of supply voltage, eliminates the necessity of increasing the power supply capacity, and simultaneously improves service efficiency of power.

The interface circuit serving as a load circuit in the present invention operates by supply of a prescribed first supply voltage (3.3 V) and a prescribed second supply voltage (1.5 V) lower than the first supply voltage. In a first operation mode, the first and second supply voltages are consumed by load, and in a second operation mode, the second supply voltage is returned to the supply side. More specifically, the interface circuit has a gate circuit, for example an invertor, which outputs an L-level signal in the first operation mode, and outputs a H-level signal in the second operation mode.

The output line of the invertor is pulled up via a pull-up resistor to a supply line of the second supply voltage. An output voltage of the invertor is compared with a prescribed reference voltage in the comparator, outputting an L-level signal when the output voltage is lower than the reference voltage, and a H-level signal when the former is higher than the latter. The invertor and the comparator operate with the first supply voltage of 3.3 V. The reference voltage of the comparator is derived from the second supply voltage of 1.5 V.

In the present invention, a first power circuit supplying the first supply voltage and a second power circuit supplying the second supply voltage are provided to the interface circuit as such a load circuit. The second power circuit receives the first supply voltage from the first power circuit, and in the first operation mode of the interface circuit (L-level output condition of the inverter), converts the first supply voltage into the second supply voltage which is supplied to the load circuit. In the second operation mode (H-level output condition of the inverter), it converts a current output from the interface circuit into the first supply voltage to feed back to the first power circuit. This second power circuit is provided with a down-converter which supplies the first supply voltage of 3.3 V converted into the second supply voltage of 1.5 V to the interface circuit, an up-converter which converts a current output from the interface circuit into the first supply voltage of 3.3 V to feed back to the first power circuit, and a control circuit which performs switching control of each of them. Each of the down-converter and the up-converter employs a non-insulating type single converter provided with, for example, a switching element. To simplify the circuit configuration, the down-converter and the up-converter are combined into an integral body.

The second power circuit integrating the down-converter and the up-converter is composed of an inductance connected from connecting points of a pair of switching elements to a plus output terminal of the second supply voltage, a capacitor connected to an output terminal of the second supply voltage, and a control circuit which on-off controls alternately, by a pulse width modulating signal for example, the pair of switching elements in the first mode and the second mode of the interface circuit. A diode is connected in parallel in the reverse polar direction to each of the pair of switching elements. When using MOS-FET, a parasitic diode produced because of the element construction is connected in parallel in the reverse polar direction to the switch section, so that it is not necessary to connect a separate diode.

As another example of the second circuit, an insulating-type converter and a control circuit thereof may be used as a down-converter and an up-converter. The insulating-type converter converts, in the second operation mode of the interface circuit, current output from the interface circuit by constant-current control into the first supply voltage of 3.3 V to feed back to the first power circuit.

Furthermore, a switching regulator which converts an input voltage into the first supply voltage by constant-voltage control to output, i.e., an insulating-type converter and a control circuit thereof, may be provided. In this case, output of the insulating-type up-converter provided in the second power circuit may be feedback-connected to an output terminal of an insulating-type converter provided between the first power circuit and the interface circuit.

According to the power circuit for interface of the present invention, when power is sent back with a supply voltage of 3.3 V from the first power circuit to the second power circuit on the side of a supply voltage of 1.5 V in the switching condition of the interface circuit serving as the lead circuit, the second power circuit acts as an up-converter relative to the returned power, thus permitting return to the first power circuit by increasing voltage to 3.3 V without consuming the returned power. At this point, the second supply voltage of 1.5 V from the second power circuit does not vary and is stable. Even when the reference voltage of the comparator provided in the interface circuit has been worked out from the second supply voltage, it does not vary and stable operation of the comparator can thus be ensured. Because the returned power is not consumed, it is not necessary to increase the power supply capacity by an extent corresponding to that consumed, as is necessary when the returned power is consumed by the dummy resistor, thereby naturally improving the service efficiency of power.

The above and other objects, features, and advantages of the present invention will become more apparent from the following detailed description with reference to the drawings.

DETAILED DESCRIPTION OF THE PREFERRED EMBODIMENTS

Figure 4:
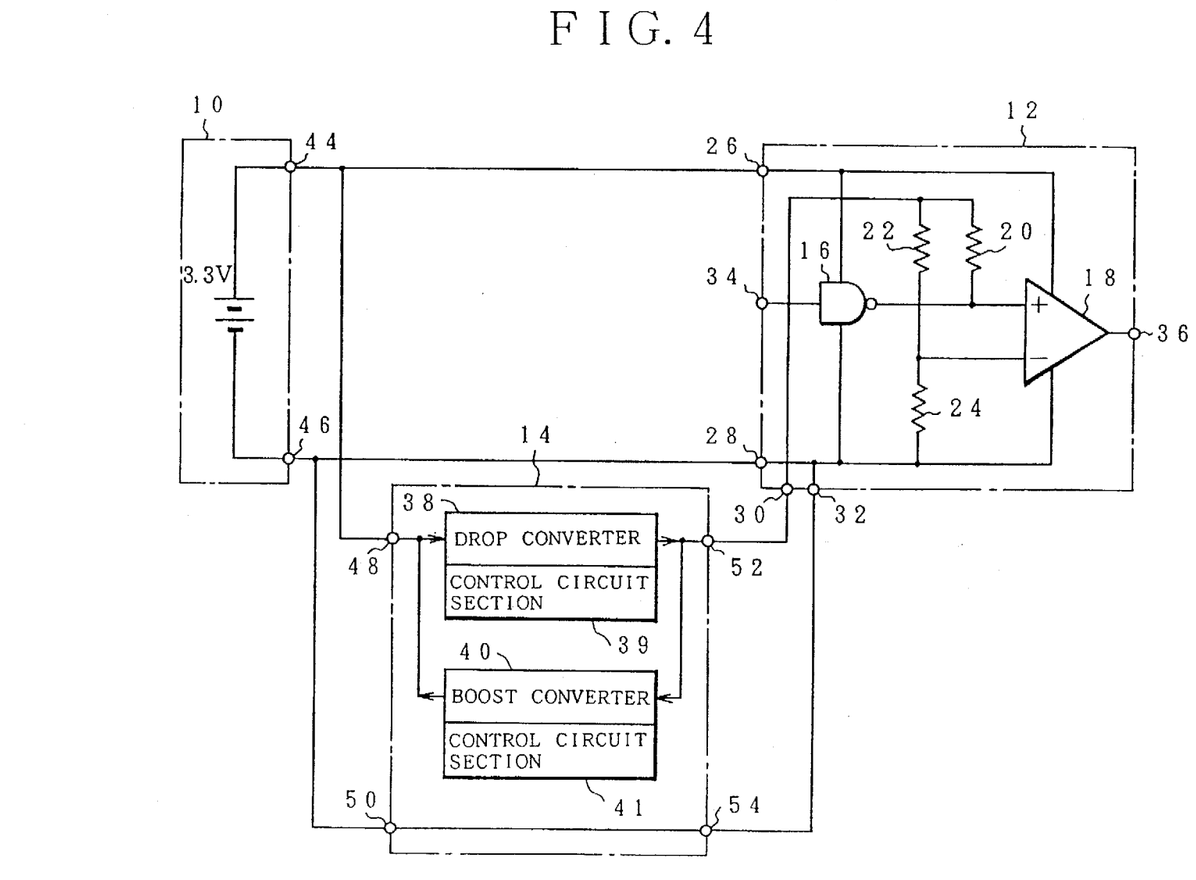
FIG. 4 is a circuit block diagram of a basic embodiment of the present invention.

FIG. 4 shows a basic embodiment of the present invention. A first power circuit 10 outputs a first supply voltage of, for example, DC 3.3 V. The first power circuit 10 may be a battery, or an ordinary power circuit which creates a DC power supply by rectification-smoothing an AC power supply. Supply voltage of DC 3.3 V from the first power circuit 10 is supplied from supply terminals 44 and 46 to supply terminals 26 and 28 of an interface circuit 12. The interface circuit 12 serving as a load circuit is provided, for example, with a converter 16 as a gate circuit, and a comparator 18. The inverter 16 and the comparator 18 operate with supply voltage of DC 3.3 V from the first power circuit 10 supplied between the supply terminals 26 and 28. The inverter 16 turns over an input signal from an input terminal 34. The comparator 18 compares an output voltage of the inverter 16 with a prescribed reference voltage: an L-level output is generated at an output terminal 36 if the output voltage is lower than the reference voltage, and a H-level output is generated at the output terminal 36 if the output voltage is higher than the reference voltage. An output line of the inverter 16 is pulled up to a second supply voltage of, for example, DC 1.5 V, supplied from the second power circuit 14 via a pull-up resistor 20. The reference voltage of the comparator 18 is created by dividing the supply voltage of DC 1.5 V from the second power circuit 14 by means of resistors 22 and 24.

The second power circuit 14 is provided with a down-converter 38 with a control circuit section 39 thereof, and an up-converter 40 with a control circuit section 41 thereof. This circuit provided with the converter 38 and the control circuit 39 is usually known as a switching regulator. In the first operation mode in which input is a H-level at the input terminal 34 of the interface circuit 12, becomes an L-level through turnover by the inverter 16, and output of the comparator 18 is an L-level, the down-converter 38 of the second power circuit 14 operates. The down-converter 38 brings the supply voltage of DC 3.3 V from the first power circuit 10 between power input terminals 48 and 50 down to DC 1.5 V, and supplies it through power output terminals 52 and 54 to the interface circuit 12. In the second operation mode, on the other hand, in which input of the input terminal 34 of the interface circuit 12 is an L-level, and the comparator 18 gives an H-level output as a result of inversion into H-level by the inverter 16, the up-converter 40 of the second power circuit 14 operates. When the comparator 18 is in the H-level state in the interface circuit 12, the supply voltage of DC 3.3 V from the first power circuit 10 to the supply terminal 26 is applied to the power output terminal 52 of the second power circuit 14 from the supply terminal of the inverter 16 through an output terminal and the pull-up resistor 20, to send the power back to the second power circuit 14 side. Upon return of current from the interface circuit 12, the up-converter 40 brings the input voltage of 1.5 V on the side of the power output terminals 52 and 54 up to 3.3 V, and feeds the power back to the first power circuit 10 from the power input terminals 48 and 50. There is also available a method in which the second power circuit 14 always acts to return a constant current to the first power circuit 10.

Figure 5:
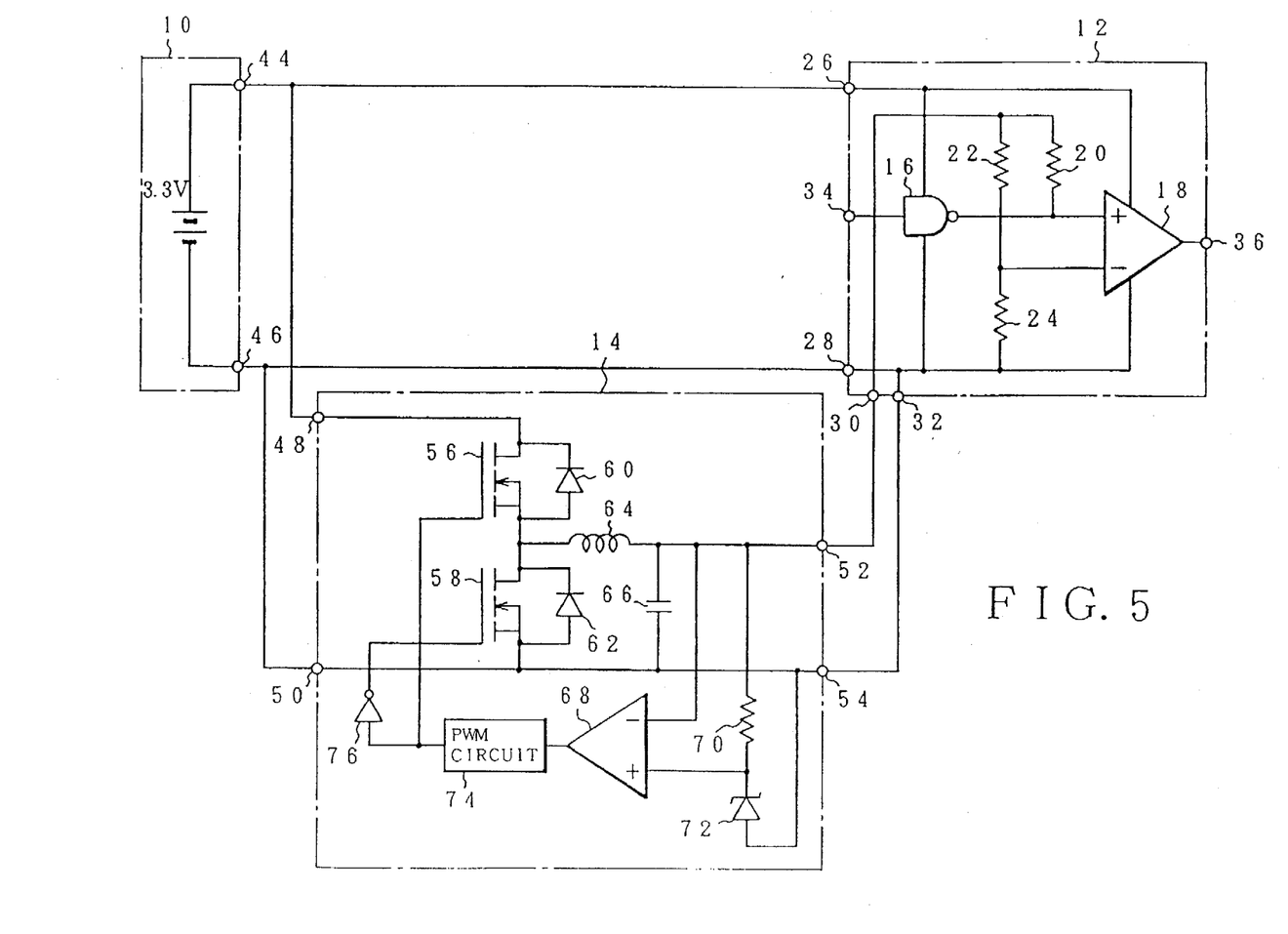
FIG. 5 is a circuit diagram of an embodiment in which a down-converter and an up-converter are integrated.

FIG. 5 shows a concrete embodiment of the down-converter 38 and the up-converter 40 provided in the second power circuit of FIG. 4. This embodiment is characterized in that the down-converter 38, the up-converter 40 and the control circuit sections thereof are integrated to simplify the circuit configuration. In the second power circuit 14, the converter composing the main circuit section comprises MOS-type FETs 56 and 58, an inductance 64 and a capacitor 66. This is a non-insulating type DC—DC converter. Diodes 60 and 62 connected in parallel in the reverse directions to the FETs 56 and 58 can be achieved by parasitic diodes generated by MOS-type FET element structure. It is not therefore necessary to connect separate diodes 60 and 62 to the FETs 56 and 58. The control circuit of the converter is composed of an error amplifier 68, a resistor 70, a Zener diode 72, a pulse width modulating circuit (hereinafter referred to as the "PWM circuit") 74 and an inverter 76. The resistor 70 and the Zener diode 72 generate a reference voltage. When there occurs a difference between an output voltage between the supply output terminals 52 and 54 of a pulse input terminal of the error amplifier 68 and the reference voltage, the error amplifier 68 outputs an error voltage corresponding to this difference to the PWM circuit 74. The PWM circuit 74 performs a pulse width control so as to bring an error voltage to zero, i.e., controls duty ratio. An output pulse from the PWM circuit 74 is supplied directly to the gate of the FET 56, and is simultaneously inverted in the inverter 76 for supply to the gate of the FET 58. The FETs 56 and 58 are therefore alternately turned on and off by a pulse signal from the PWM circuit 74.

Figure 6:
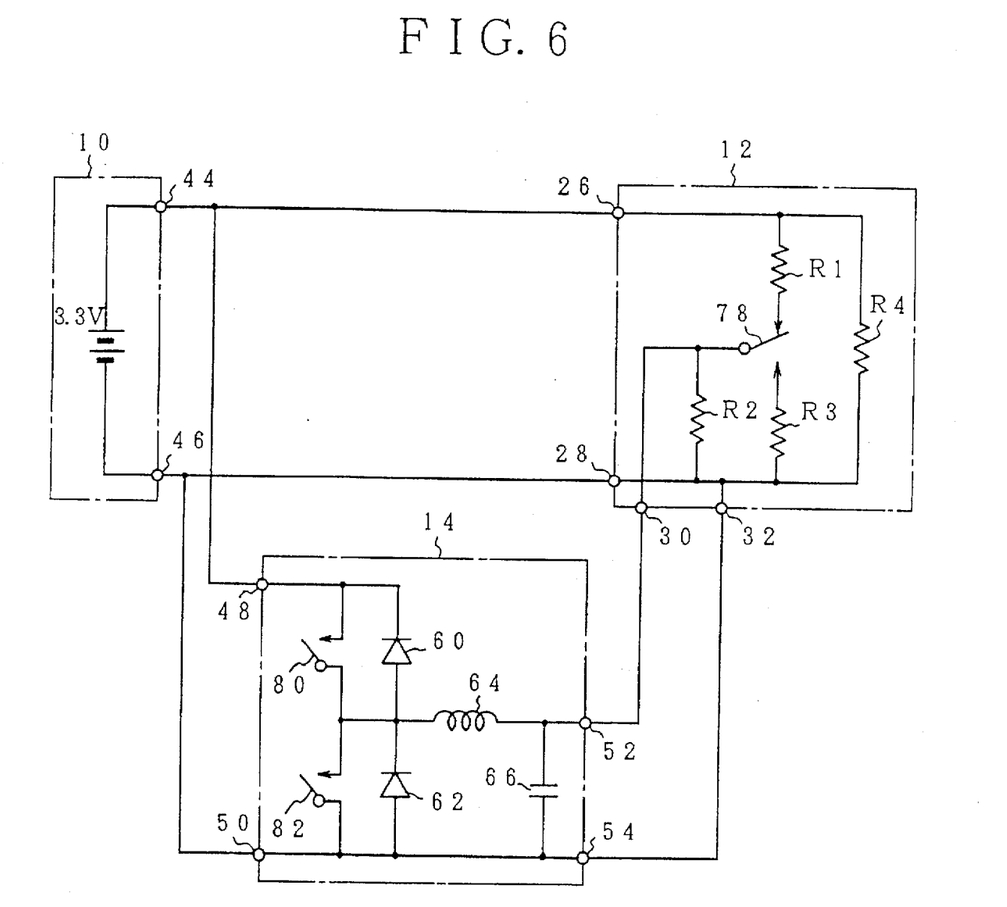
FIG. 6 is an equivalent circuit diagram of FIG. 5.

FIG. 6 shows an equivalent circuit to that shown in FIG. 5. The interface circuit 12 can be deemed as a load circuit 12' as an equivalent circuit. The reversing function of the input level by the inverter 16 is replaced with a switch 78. When an output of the inverter 16 is an H-level, i.e., in the second operation mode in which power is returned to the second power circuit 14, the switch 78 is closed on the side of an equivalent resistance R1 connected to a line from the supply terminal 26. As a result, the supply voltage of DC 3.3 V from the first power circuit 10 is returned through the resistance R1 and the switch 78 to the portion between the power output terminals 52 and 54. At this point, there is present an equivalent resistance R2 on the common terminal side of the switch 78. Accordingly, the first supply voltage of DC 3.3 V between the terminals 26 and 28 is divided by the equivalent resistances R1 and R2. In a stable state, the equivalent resistance R1 has an end voltage of 1.8 V f and the equivalent resistance R2 has an end voltage of 1.5 V.

In the L-level condition of the inverter 16, on the other hand, the switch 78 is changed over to connection of an equivalent resistance R3 connected on the minus line side. In this state, power is supplied only from the second power circuit 14 to the equivalent resistance R3. The pair of FETs 56 and 58 provided in the second power circuit 14 are changed over by switches 80 and 82. Control circuit sections for the switches 80 and 82 are omitted here.

Figure 7A:
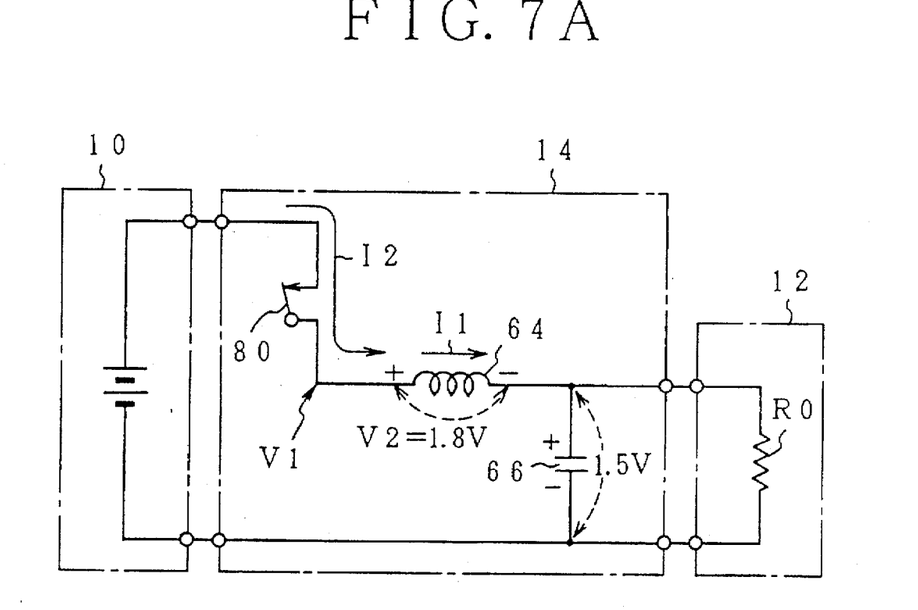
FIGS. 7A and 7B are descriptive views of operations during down time.
Figure 7B:
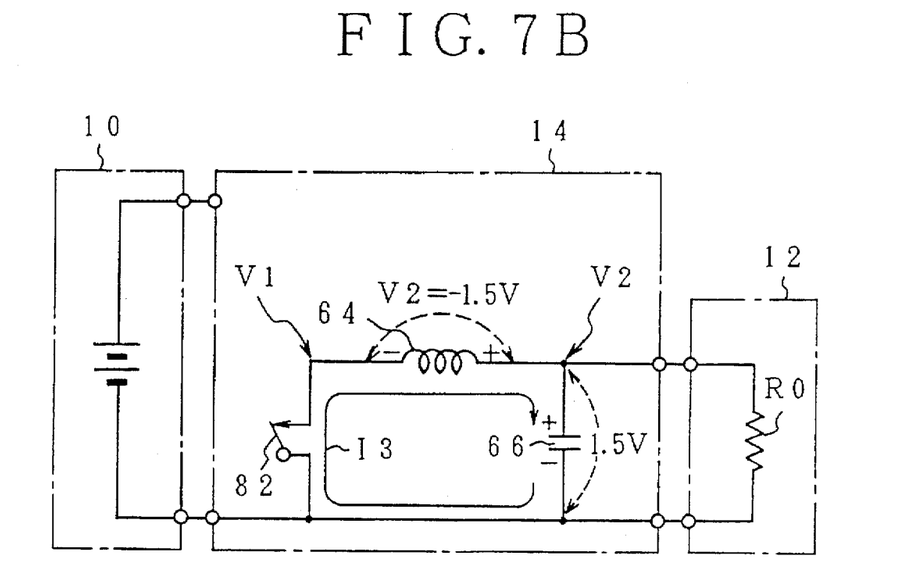

FIG. 7A shows the operation with the switch 80 being on and the switch 82 being off during down operation of the equivalent circuit shown in FIG. 6. FIG. 7B shows the operation when the switch 82 is turned on and the switch 80 is turned off then. In this case, since the interface circuit 12, in a state in which the switch 78 is changed over to the equivalent resistance R3 side by an L-level output of the inverter 16, is represented by an equivalent resistance R0 which is the parallel resistance value of the equivalent resistances R2 and When the switch 80 is turned on in FIG. 7A, current flows through the switch 80 and an inductance 64 to a capacitor 66 and the additional resistance R0 under the effect of the supply voltage of DC 3.3 V from the first power circuit 10.

In FIG. 7A, current flowing inductance 64 is represented by I1, current flowing to the switch 80, by I2, potential at the connecting point of the switches 80 and 82, by V1, and the end voltage of the inductance 64, by V2. Energy is charged to the inductance 64 by the current flowing through the inductance 64. At the same time, the capacitor 66 is charged, and in addition, current is supplied to the equivalent resistance R0 of the interface circuit 12. In the state of this switch 82 being on, the inductance has a reverse polarity as compared with that shown in FIG. 7A, with an end voltage V2 of −1.5 V, and constant voltage control is effected so as to give an end voltage of 1.5 V of the capacitor.

Figure 8A:
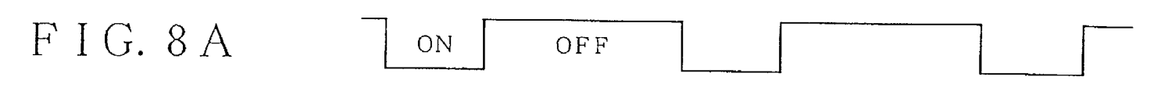
FIGS. 8A–8G are timing charts; and during down time.
Figure 8B:
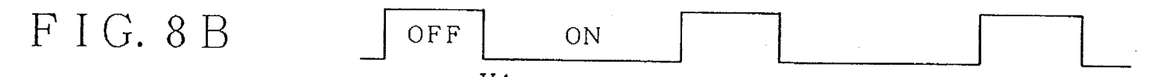
Figure 8C:
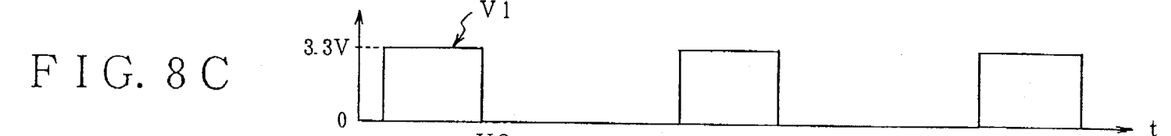
Figure 8D:
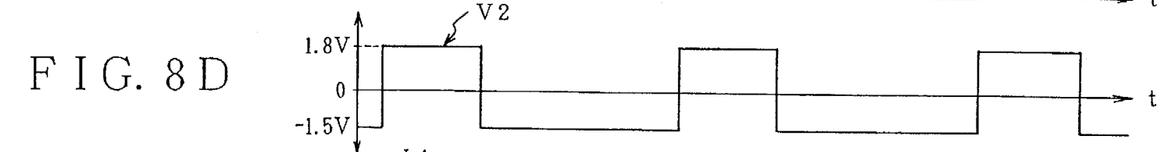
Figure 8E:
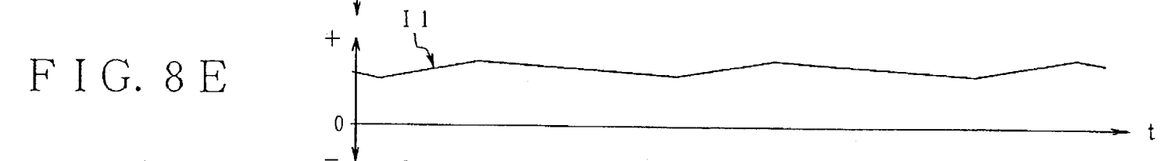
Figure 8F:
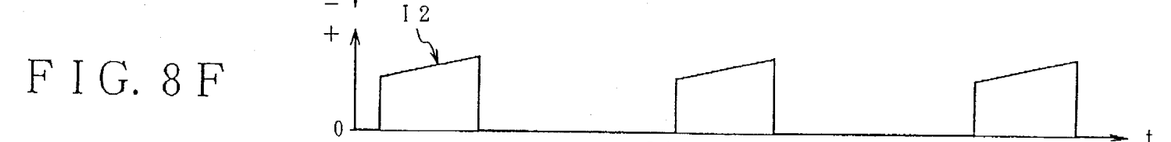
Figure 8G:
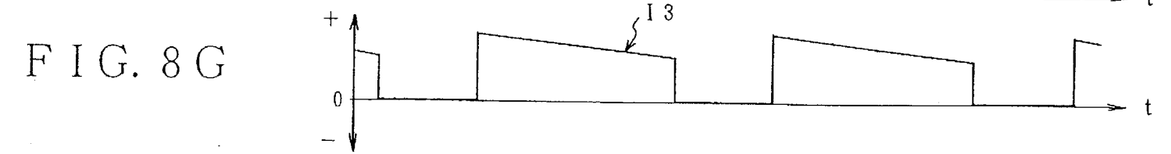

FIGS. 8A to 8G are timing charts during down time of the equivalent circuit shown in FIG. 3. FIG. 8A shows on/off of the switch 80 and FIG. 8B shows on/off of the switch 82: one being on corresponding to the other being off. When the switch 80 shown in FIG. 8A is on, potential V2 at the connecting point of the switches 80 and 82 as shown in FIG. 7A is 3.3 B as shown in FIG. 8C. At this point, the inductance 64 has an end voltage V2 of 1.8 V as shown in FIG. 8D. Current I1 flowing through the inductance 64 increases with a slow gradient as shown in FIG. 8E. Current flowing through the switch 80 is as shown in FIG. 8F and has the same value as current I1 flowing through the inductance 64 of FIG. 8E. Furthermore, current I3 of the switch 82 is zero as shown in FIG. 8G since the switch 82 is off.

Then, when the switch 80 is off in FIG. 8A, and the switch 82 is on in FIG. 8B, voltage V1 in FIG. 8C becomes 0 V because connection with the first power circuit is cut off. The end voltage V2 of the inductance 64 in FIG. 8D is changed over to −1.5 V with a reverse polarity. At this point, current I1 flowing through the inductance 64 slowly decreases at a certain gradient as shown in FIG. 8E. Current I3 flowing through the switch 82 decreases at the same gradient as that of current I1 in FIG. 8E. However, current flows in the minus direction since current direction is reverse from bottom to top. A constant voltage of 1.5 V is thus supplied to the interface circuit 12 in a state in which, during down time, DC 3.3 V from the first power circuit 10 is brought down to 1.5 V and stabilized on this level.

Figure 9A:
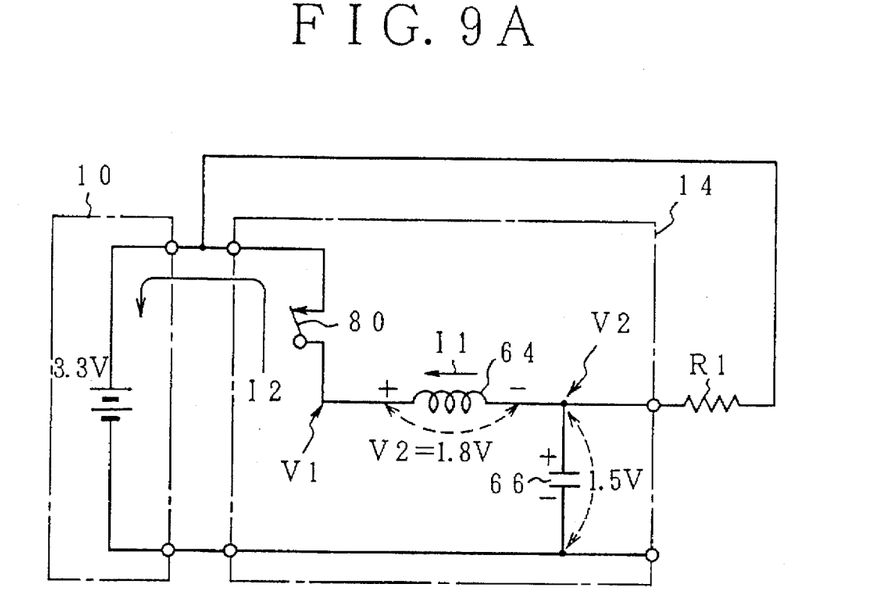
FIGS. 9A and 9B are descriptive views of operations during up time.
Figure 9B:
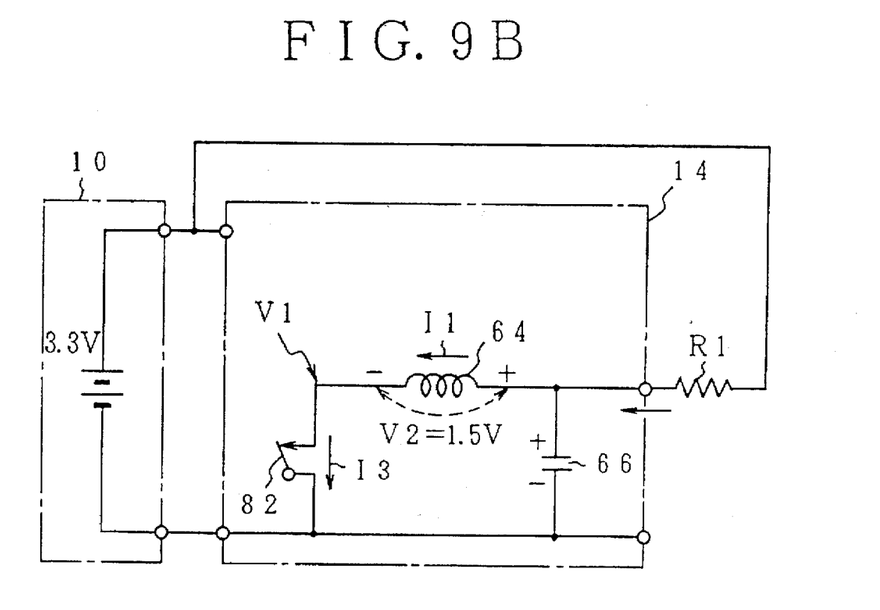

FIG. 9A shows the operation when the switch 80 is on during up time of the second power circuit 14, and FIG. 9B shows the operation when the switch 82 is on. During up time, the inverter 16 of the interface circuit 12 generates an H-level output and is in a state in which the switch 78 is closed to the equivalent resistance R1, as shown in the equivalent circuit of the interface circuit 12 in FIG. 6. For up time, the state of the switch 82 being on in FIG. 9B is described first below. When the switch 82 is turned on, a supply voltage of 3.3 V is feedback-entered from the constant-voltage source 10 of the interface circuit 12 to the second power circuit 14 through the resistance R1. Current flows through a path including the inductance 64 and the switch 82 in parallel with charging of the capacitor 66, and energy is charged into the inductance 64. In this drawing, current of the inductance 64 is represented by I1, current of the switch 82, by I3, end voltage of the inductance 64, by V2, and voltage of the switch 82, by V1.

Then, it is assumed that the switch 82 is turned off from the on-state of the switch 82 in FIG. 9B, and the state is changed over to that shown in FIG. 9A where the switch 80 is on. In the state of FIG. 9A, current flows through the path comprising the switch 80, the first power circuit 10 and the capacitor 66 by the energy charged into the inductance 64. Current flowing through the switch 80 at this moment is represented by I2. The capacitor 66 has an end voltage of 1.5 V, and the inductance 64 has an end voltage V2 of 1.8 V. A feedback power supply of 3.3 V is created by configuring an up-circuit through connection in series. Consequently, the energy charged from the interface circuit 12 into the inductance 64 is fed back to the first power circuit 10 by up operation.

Figure 10A:
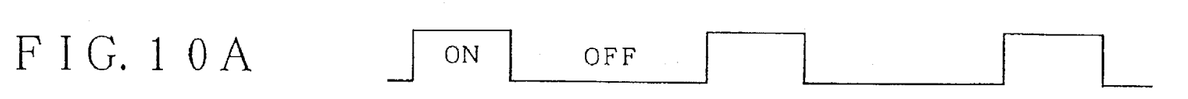
FIGS. 10A–10G are timing charts during up time.
Figure 10B:
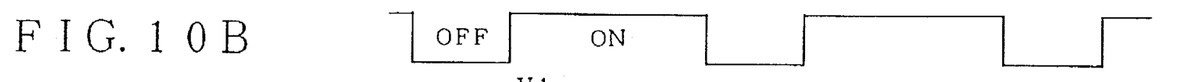
Figure 10C:
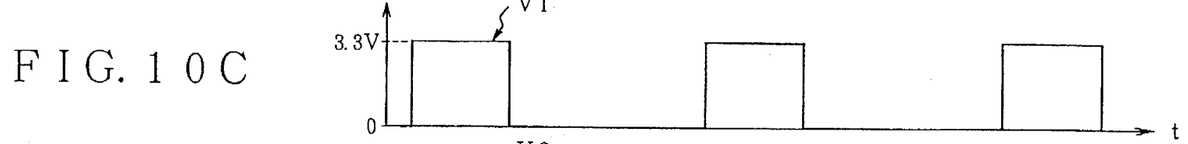
Figure 10D:
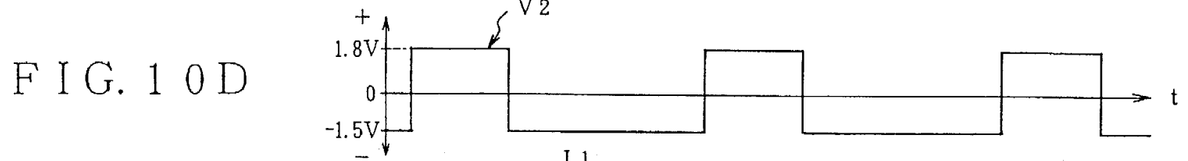
Figure 10E:
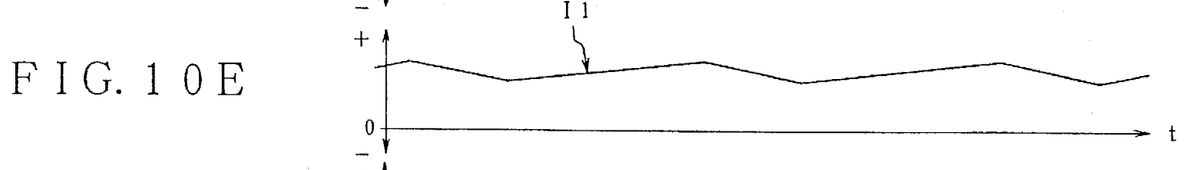
Figures 10F, 10G:
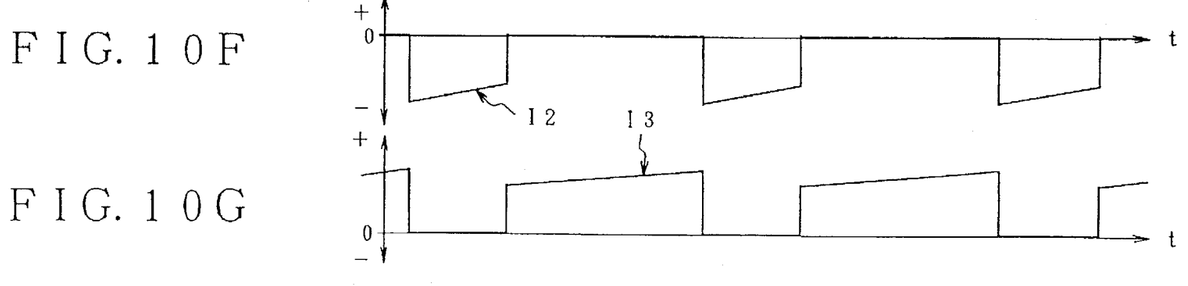

FIGS. 10A to 10G are timing charts in the up operation of FIGS. 9A and 9B. When the switch 80 is off in FIG. 10A, and the switch 82 is on in FIG. 10B, charging is accomplished with the power fed back from the interface circuit 12 so as to give a voltage V1 of 0 V in FIG. 10C and an end voltage V2 of −1.5 V for the inductance 64 in FIG. 10D. At this point, current I1 of the inductance 64 in FIG. 10E is slowly increasing. Current I3 flowing through the switch 82 in FIG. 10G, being a current in the plus direction, shows the same change as that of current I1 flowing through the inductance 64 in FIG. 10E.

When the switch 80 is on in FIG. 9A, and the switch 82 is off in FIG. 9B, voltage V1 at the connecting point between the switch 80 and the inductance 64 increases to 3.3 V as shown in FIG. 10C, and end voltage V2 of the inductance 64 in FIG. 10D takes a value of 1.8 V along with constant-voltage control of end voltage of the capacitor 66 to 1.5 V. Current I1 of the inductance 64 of FIG. 10E slowly decreases, and current I2 flowing through the switch 80, represented by the minus direction, shows the same change. The power returned by the interface circuit 12 through these operations during up time is brought up and fed back to the first power circuit 10, so that power is never consumed by, for example, a load resistance.

In alternate on/off condition of the switches 80 and 82, there is a timing when the switches 80 and 82 are simultaneously turned off upon changing over. At this point, an initial current flows through a path bypassing the switches 80 and 82, passing through each of diodes 60 and 62, and thereafter, the status is switched over to the original path of current by turning on the switch 80 or 82. Therefore, even when there is a timing when the switches 80 and 82 are simultaneously turned off, bypass connection by the diodes 60 and 62 is ensured, thus permitting prevention of occurrence of spike noise by complete separation.

Figure 11:
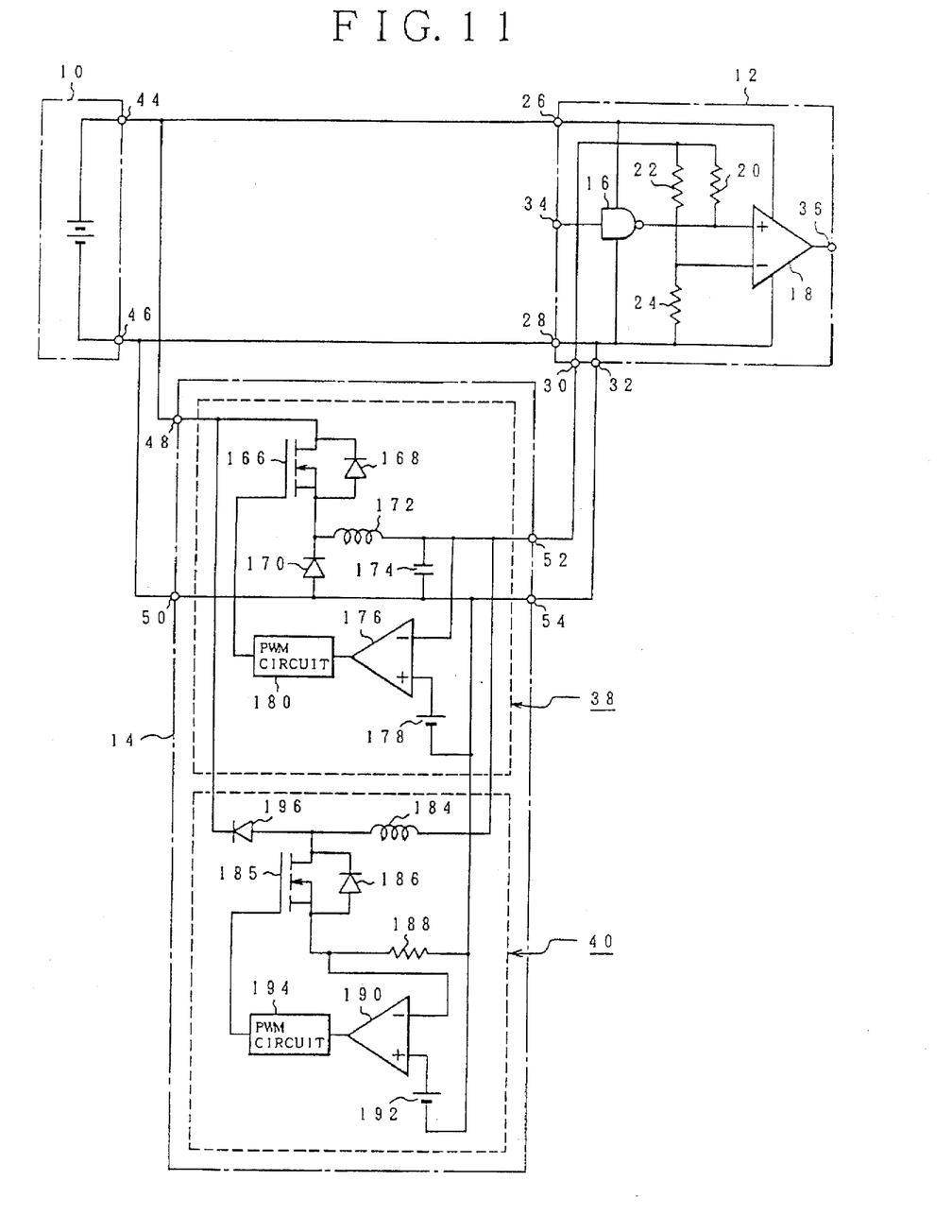
FIG. 11 is a circuit diagram of an embodiment in which a down-converter and an up-converter are separately provided.

FIG. 11 shows another concrete embodiment of the down-converter 38 and the up converter 40 provided in the second power circuit 14 shown in FIG. 4. In this embodiment, converters and control circuit sections thereof are not common, but separately provided. The down-converter 38 has a main circuit section constituting a non-insulating type DC—DC converter provided with an MOS-type FET166, and connected with a diode 170 in series with the FET166 with a reverse polarity. An end of an inductance 172 is connected to the connecting point of the FET166 and the diode 170, and the other end is connected to a power output terminal 52. A capacitor 174 is connected between the power output terminals 52 and 54. The control circuit section of the down-converter 38 comprises an error amplifier 176 and a PWM circuit 180. The error amplifier 176 compares a reference voltage of 1.5 V based on a reference voltage source 178 and an output voltage and outputs the resultant error voltage to the PWM circuit 180. The PWM circuit 180 controls the duty ratio of a PWM signal to FET166 so as to achieve an error voltage of zero.

The down-converter 38 using such a non-insulating type single converter charges energy into the inductance 172 upon turn-on of the FET166 by the PWM circuit 180, and constant-voltage-controls an output voltage having charged the capacitor 174 to a prescribed voltage of 1.5 V by altering the time interval between energy charges caused by turning on the FET166. The up-converter 40 has an MOS-type FET185 formed by connecting an inductance 184 in series to a main circuit section composing a non-insulating type DC—DC converter, and further a current detecting resistance 188 is connected in series to the FET185. When the FET185 is turned on, the inductance 184 is charged by being supplied with power from the interface circuit 12. When the FET185 is turned off, energy charged into the inductance 184 is discharged through a path comprising a diode 196, the first power circuit 10, and a capacitor 174, to feed back the energy having been charged into the inductance 184 to the first power circuit 10. The control circuit section of the up-converter 40 is provided with an error amplifier 190 and a PWM circuit 194. A current detecting voltage from the current detecting resistance 188 connected in series to the FET185 and the reference voltage from the reference voltage source are entered into the error amplifier 190. The error amplifier 190 therefore outputs an error signal corresponding to an error in the detected current relative to a certain current determined by the reference voltage source, and the PWM circuit 194 PWM-controls the FET185 so as to maintain output current on a constant level.

Figure 12:
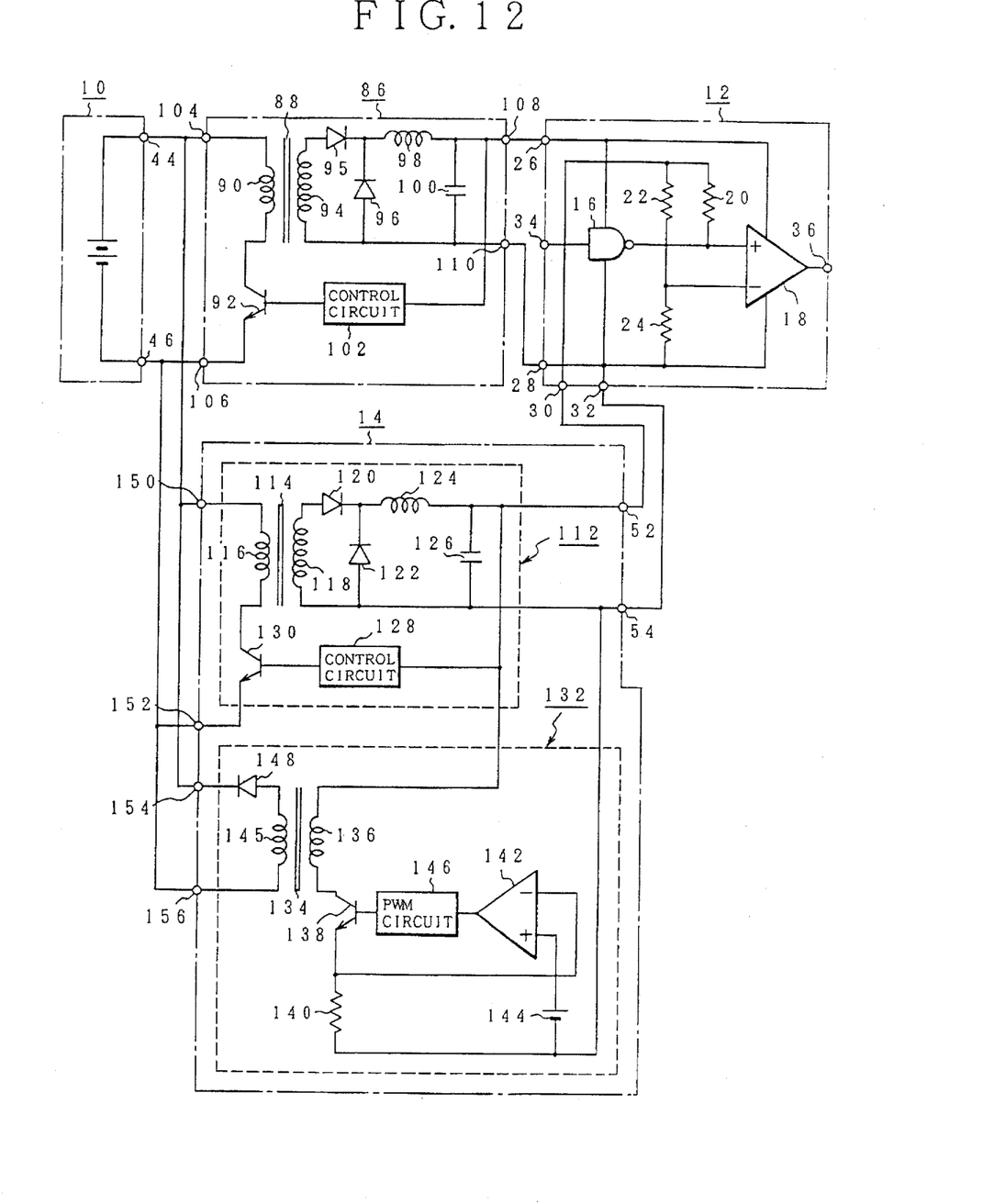
FIG. 12 is a circuit diagram of an embodiment in which a switching regulator is used for down and up operations.

FIG. 12 shows another embodiment of the present invention. This embodiment is characterized by the use of a switching regulator provided with an insulating type DC—DC converter which electrically separates the primary side from the secondary side for down and up operations of the second power circuit and a control circuit thereof. Also for power supply from the first power circuit, a switching regulator having an insulating type DC—DC converter for constant-voltage control and a control circuit thereof is provided. In a power supply line from the first power circuit 10 to the interface circuit 12, a switching regulator 86 for constant-voltage control of the first supply voltage of 3.3 V is provided. The main circuit section of the switching regulator 86 is provided with an insulating type DC—DC converter, i.e., a transistor 92 is connected in series to a primary winding 90 of a transformer 88. Following a secondary winding 94 of the transformer 88, a rectifying circuit using diodes 95 and 96 is provided, with furthermore a choke coil 98 and a capacitor 100 for smoothing. A control circuit 102 of the switching regulator 86 compares a received output voltage with a predetermined reference voltage and creates a PWM signal on the basis of an error voltage thereof to on/off-control the transistor 92. In the control circuit 102 also, the primary side and the secondary side are internally isolated. The switching regulator 86 stabilizes an input voltage from the first power circuit 10 to power input terminals 104 and 106 at a value of 3.3 V, and supplies the thus stabilized power from power output terminals 108 and 110 to the interface circuit 102. The switching regulator 86 is effective when supplying always stable first supply voltage of 3.3 V relative to variations in the power supply capacity for the purpose of driving a plurality of interface circuits 12 provided in parallel.

The second power circuit 14 is provided with a first switching regulator 112 acting as a down-circuit, and a second switching regulator 132 acting as an up-circuit. The switching regulator 124 for down-operations has a transistor 130 connected in series to a primary winding 116 of a transformer 114 as an insulating type DC—DC converter of a main circuit section. Following a secondary winding 118 of the transformer 112, there are provided a rectifying circuit of diodes 120 and 122, with furthermore a choke coil 124 and a capacitor 126 for smoothing. A control circuit 128 receives an output voltage, compares same with a predetermined reference voltage of 1.5 V to create an error voltage, generates a PWM signal having a duty ratio so as to achieve an error of zero, and thus on/off-controls the transistor 130. In the control circuit 128, the primary side and the secondary side are internally isolated. This switching regulator 112 for down-operations is basically the same as the switching regulator provided on the side of the first power circuit 10. A switching regulator 132 for up-operations has a transistor 138 connected in series to a primary winding 136 of a transformer 134 as an insulating type DC—DC converter forming a main circuit section, and further connected to a current detecting resistance 140. The control circuit section is provided with an error amplifier 142 and a PWM circuit 146. The error amplifier 142 outputs a differential voltage as compared with a voltage detected by the current detecting resistance 140 relative to a certain current set by a reference voltage source 144. The PWM circuit 146 outputs a PWM signal controlled so as to give a duty ratio achieving an error voltage of zero to on/off-control the transistor 138. A voltage brought up by a winding ratio is induced in a secondary winding 145 of the transformer 134, rectified at a diode 148, and fed back to the first power circuit 10 under constant-current control.

Figure 13:
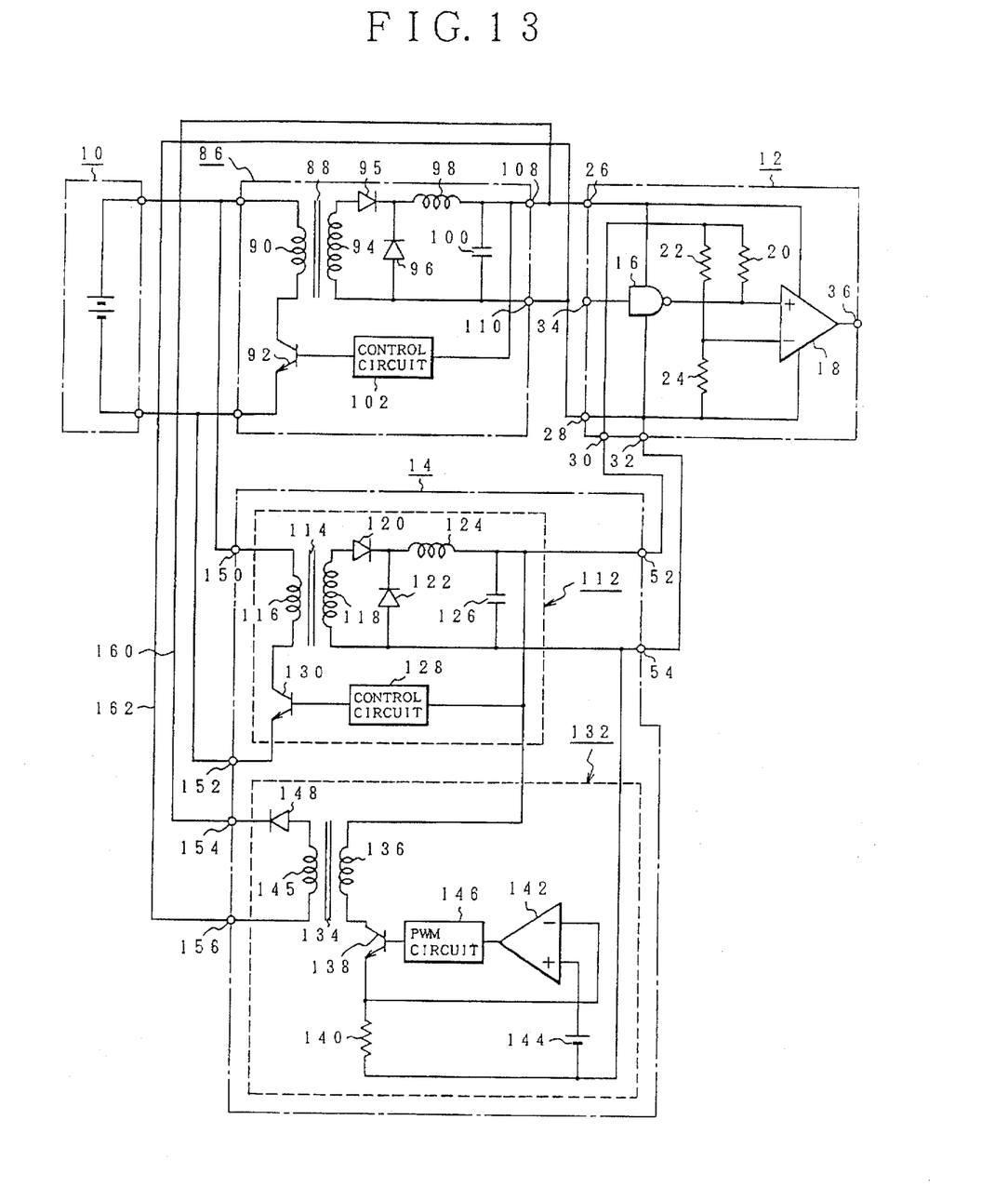
FIG. 13 is a circuit diagram of a variation of the embodiment shown in FIG. 12.

FIG. 13 shows a variation of the embodiment shown in FIG. 12. This embodiment is characterized in that an output of the switching regulator 132 for up-operations of the second power circuit 14 is fed back to an output end of the switching regulator provided between the first power circuit 10 and the interface circuit 12. Consequently, power feedback lines 160 and 162 are pulled out from output terminals 154 and 156 of the switching regulator 132 for up-operations, and are connected to supply lines from output terminals 108 and 110 of the switching regulator 86 to the interface circuit 12. Output voltage between power output terminal 108 and 110 of the switching regulator 86 is affected by the current feedback from the switching regulator 132 for up-operations. However, since constant-current control is applied to inhibit fluctuation of output voltage caused by feedback in the control circuit 102 of the switching regulator 86, a stable first supply voltage of 3.3 V can be supplied to the interface circuit 12 even in the presence of power feedback. To the extent of power feedback, the power consumption by the first power circuit 10 can be saved.

According to the present invention, as described above, in the operation mode of the interface circuit serving as the load circuit, even if power is returned by a supply voltage from a higher power circuit section to a lower power circuit section, the lower power circuit section brings up the returned power while keeping a constant voltage to feedback same to a lower supply voltage, whereby the lower supply voltage to the interface circuit does not vary with the return of power, and stable operations can be ensured while keeping a constant reference voltage of the comparator provided in the interface circuit.

Because the power returned from the interface circuit serving as the load circuit is brought up and fed back to the original down-side power circuit section, it is possible to utilize the power again as supply power, and improve service efficiency of the power supply through this regeneration of power.

Since the power returned by the interface circuit is never consumed wastefully by a dummy resistor, for example, it is possible to avoid such an uneconomical situation in which the power supply capacity of a power circuit producing a high supply voltage is increased by an amount corresponding to the consumption of feedback power.

In the embodiments shown in FIGS. 12 and 13, the description has covered a case in which a switching regulator 86 has been provided between the first power circuit 10 and the interface circuit 12. It is however needless to mention that a configuration may be adopted in which a switching regulator 86 is not provided, but a switching regulator 112 for down-operations and a switching regulator 132 for up-operations are provided only for the second power circuit.

As the power-down circuit used in the second power circuit 14 and the power-up circuit for power feedback in the present invention, any appropriate switching regulator may be used, not limiting to no-insulating and insulating switching regulators of the embodiments. While the above-mentioned embodiments have covered the cases with a first supply voltage of 3.3 V and a second supply voltage of 1.5 V, the voltage used for the interface circuit is not limited to these cases.

An inverter has been used as an example of the gate circuit for the interface circuit 12, whereas applicable gate circuits include an AND gate, an OR gate, an NAND gate and other appropriate gates only if the output line to the comparator is pulled up under the second supply voltage. The present invention is not of course limited to figures given in the embodiments.

What is claimed is:

1. A power supply apparatus comprising:
    a load circuit which operates by supply of a prescribed first supply voltage and a second supply voltage different from said first supply voltage, consumes said first supply voltage and said second supply voltage by a load in a first operation mode, and returns said first supply voltage to a supply side of said second supply voltage in a second operation mode;
    a first power circuit which supplies said first supply voltage to said load circuit; and
    a second power circuit which receives input of said first supply voltage from said first power circuit, converts said first supply voltage into said second supply voltage and supplies the converted voltage to said load circuit in said first operation mode of said load, and converts a current output from said load circuit into said first supply voltage and feeds back the converted voltage to said first power circuit in the second operation mode of said load circuit, said second power circuit comprises:
        a down-converter which converts said first supply voltage into said second supply voltage and supplies same to said load circuit in said first operation mode of said load circuit,
        an up-converter which converts a current output from said load circuit into said first supply voltage and feeds same back to said first power circuit in the second operation mode of said load circuit, and
        a control circuit which switching-controls each of said down-converter and said up-converter.

2. An apparatus according to claim 1, wherein:
    said load circuit comprises:
        a gate circuit which processes an input signal, outputs an L-level signal in said first operation mode, and outputs a H-level signal in said second operation mode;
        a pull-up resistor which pulls up an output line of said gate circuit to a supply line of said second supply voltage; and
        a comparator which compares an output voltage of said gate circuit with a prescribed reference voltage, outputs an L-level signal when the output voltage is lower than said reference voltage, and outputs an H-level signal when the output voltage is higher than said reference voltage; and said gate circuit and said comparator operating under said first supply voltage, and said reference voltage being created from said second supply voltage.

3. An apparatus according to claim 1, wherein said down-converter and said up-converter are connected in parallel.

4. An apparatus according to claim 1, wherein:

each of said down-converter and said up-converter is a non-isolating type single converter provided with a switching element.

5. An apparatus according to claim 1, wherein:

said down-converter, said up-converter and said control circuit are integrated into a body.

6. An apparatus according to claim 5, wherein:

the second power circuit further comprises:

a pair of switching elements connected in series between input terminals of said first supply voltage;

an inductance connected from a connecting point of said pair of switching elements to between plus output terminal of said second supply voltage;

a capacitor connected between output terminals of said second supply voltage; and said control circuit which alternately on/off controls said pair of switching elements by means of a pulse width modulating signal so as to keep an end voltage of the output terminal of the second supply voltage to said load circuit at a prescribed value in the first and second operation modes of said load circuit.

7. An apparatus according to claim 6, wherein:

diodes are connected in the direction of the reverse polarity in parallel with each of said pair of switching elements.

8. An apparatus according to claim 7, wherein:

said pair of switching elements are an MOS-FET in which said diodes are parasitic diodes which are generated because of the element structure and are connected in the direction of the reverse polarity in parallel with a switch section.

9. An apparatus according to claim 1, wherein:

each of said down-converter and said up-converter comprises an isolating type converter and a control section.

10. An apparatus according to claim 9, wherein:

said isolating type up-converter converts a current output from said load circuit into said first supply voltage through constant-current control and feeds same back to said first power circuit in the second operation mode of said load circuit.

11. An apparatus according to claim 9, wherein:

said isolating type converter and said control section thereof which convert an input voltage into said first supply voltage through constant-voltage control and output same are provided between said first power circuit and said load circuit.

12. An apparatus according to claim 11, wherein:

an output of the isolating type up-converter provided in said second power circuit is feedback-connected to an output terminal of the isolating type converter provided between said first power circuit and said load circuit.

* * * * *